United States Patent
Thompson, II

(10) Patent No.: US 8,730,235 B2
(45) Date of Patent: May 20, 2014

(54) METHOD FOR DETERMINING POINT CONNECTIVITY ON A TWO MANIFOLD IN 3D SPACE

(75) Inventor: Thomas V. Thompson, II, Monrovia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 654 days.

(21) Appl. No.: 12/906,718

(22) Filed: Oct. 18, 2010

(65) Prior Publication Data

US 2012/0013618 A1    Jan. 19, 2012

Related U.S. Application Data

(60) Provisional application No. 61/364,308, filed on Jul. 14, 2010.

(51) Int. Cl.
*G06T 17/20* (2006.01)

(52) U.S. Cl.
USPC .......................................................... 345/423

(58) Field of Classification Search
USPC .......................................................... 345/423
See application file for complete search history.

(56) References Cited

U.S. PATENT DOCUMENTS

| | | | | |
|---|---|---|---|---|
| 5,772,124 A | * | 6/1998 | Tamaki et al. | 239/533.12 |
| 6,100,893 A | * | 8/2000 | Ensz et al. | 345/420 |
| 6,108,006 A | * | 8/2000 | Hoppe | 345/423 |
| 6,121,973 A | * | 9/2000 | Itoh et al. | 345/423 |
| 6,137,493 A | * | 10/2000 | Kamimura et al. | 345/423 |
| 6,167,159 A | * | 12/2000 | Touma et al. | 382/242 |
| 6,208,348 B1 | | 3/2001 | Kaye | |
| 6,208,997 B1 | * | 3/2001 | Sigeti et al. | 1/1 |

(Continued)

OTHER PUBLICATIONS

Ruggeri, M. R. (Jul. 2007), Geodesics for Point Based Model Processing, Thesis, University of Konstanz, Baden-Wurttemberg, Germany.*

(Continued)

*Primary Examiner* — Ulka Chauhan
*Assistant Examiner* — Roberta D Prendergast
(74) *Attorney, Agent, or Firm* — Dorsey & Whitney LLP

(57) ABSTRACT

One particular implementation of the present invention may involve a method for determining connectivity of a plurality of points on a surface of a computer-generated object in 2D or 3D space. In general, the method may utilize a recursion process to determine or approximate a plurality of association region boundaries related to the points on the computer-generated object. The method may include a first stage of a refinement operation that may recursively search the surface of the computer model for the region boundaries of the set of points, a stopping operation that may cease the recursive search when an acceptable tolerance is achieved and a connecting operation that may use the determined region boundaries to connect the series of points on the surface of the model to form a connectivity graph of the points. The connectivity information obtained through the above method may be utilized as part of an interpolation process to generate hair or fur along the surface of the object.

20 Claims, 14 Drawing Sheets

(56) References Cited

U.S. PATENT DOCUMENTS

| | | | |
|---|---|---|---|
| 6,515,659 B1 | 2/2003 | Kaye | |
| 6,611,267 B2 * | 8/2003 | Migdal et al. | 345/428 |
| 6,686,926 B1 | 2/2004 | Kaye | |
| 6,720,962 B1 * | 4/2004 | Alter | 345/420 |
| 6,952,218 B1 * | 10/2005 | Bruderlin | 345/581 |
| 7,098,911 B2 * | 8/2006 | Chen et al. | 345/420 |
| 7,102,633 B2 | 9/2006 | Kaye | |
| 7,116,323 B2 | 10/2006 | Kaye | |
| 7,116,324 B2 | 10/2006 | Kaye | |
| 2008/0266292 A1 * | 10/2008 | Gornowicz et al. | 345/423 |

OTHER PUBLICATIONS

Gopi, M., S. Krishnan, and C. T. Silva. "Surface Reconstruction based on Lower Dimensional Localized Delaunay Triangulation", Eurographics 2000, vol. 19, No. 3, Aug. 2000.*

Zhou, Hai, Narendra Shenoy, and William Nicholls, "Efficient minimum spanning tree construction without Delaunay triangulation", Proceedings of the 2001 Asia and South Pacific Design Automation Conference, ACM, Jan. 2001.*

Zwicker et al., "Meshing Point Clouds Using Spherical Parameterization," Eurographics Symposium on Point-Based Graphics, 8 pages, 2004.

* cited by examiner

METHOD FOR DETERMINING POINT CONNECTIVITY ON A TWO MANIFOLD IN 3D SPACE

CROSS-REFERENCE TO RELATED APPLICATIONS

This application claims the benefit under 35 U.S.C. §119(e) to U.S. Provisional Patent Application No. 61/364,308, filed Jul. 14, 2010 and titled "Determining Guide Connectivity," the disclosure of which is hereby incorporated herein in its entirety.

FIELD OF THE INVENTION

Aspects of the present invention relate to computer generated images and, more particularly, to connecting points on one or more surfaces of a three-dimensional (3D) computer-generated model for purposes such as determining area of influence, simplification, interrogation or manipulation.

BACKGROUND

Computer-generated objects often benefit from connectivity information for a plurality of points along the surface of the object. For example, point connectivity information may aid in performing topographical modeling, three-dimensional modeling of an object, architectural modeling in a computer-aided design program. In general, connectivity information for a plurality of points along a surface of a computer-generated object may aid the manipulation of any computer-generated object.

In one particular example, point connectivity on the surface of the a computer-generated object may improve the appearance of hair or fur that is placed along the surface of a computer-animated object. For example, hair strands or other similar features on the object are often created using an interpolation process that uses one or more guide curves to determine the placement and look of thousands of the hair strands. More particularly, an individual of a computer-generated object will often create several guide curves that may dictate the position and look of the hair strands near the guide curves and locate them on the surface of the object. In general, a single guide curve may dictate the position and look of several thousand hair strands generated along the surface of the object. Once the guide curves are located on the object's surface, a computer program will often utilize an interpolation process to fill in the area between the guide curves along the surface of the object with generated hair strands. In this manner, a computing system may create several thousand interpolated hair strands from a few guide curves created by the individual and placed along the surface of the object, thereby removing the need for the individual to animate or draw each individual hair in a time-consuming fashion.

More particularly, once the guide curves are placed on the surface of the object by the individual, the interpolation process performed by the computing system may evaluate the guide curves in an attempt to provide a natural appearing interpolation of the hair of the object. In general, the interpolation process may involve determining which guide curve to apply to each generated hair strand, assigning a weight to each guide curve and blending the guide curves to create interpolated hair. However, determining which guide curve applies to each hair strand during the generation process can be difficult, especially when the hair interpolation is applied on a 3-D model. For one, the guide curves may lie across multiple surfaces of the computer-generated object, such as subdivisions, nurbs or polys, with each facing a different direction and little to no connectivity information between the surfaces. Thus, while the individual may intend for a specific guide curve to apply to a particular region of the object, the interpolation process may mistakenly apply a different guide curve to the region from the same surface subdivision. Also, the placement of the guide curves may be unordered by the individual, from closely located guide curves to distant locations across multiple faces. Without proper connectivity information the mixture of sparse and dense guide placement may result in uneven generation of the hair strands.

To address some of these difficulties, many computer programs capable of performing the interpolation hair-generation process restrict the placement of guide curves along the surface to qualifying face boundaries. Similarly, many computer programs may limit the number of guide curves located within a certain area such that the density of the points does not exceed a threshold. These restrictions, however, take some control away from the individual to manipulate the interpolated hair as desired with a second result that the generated object may not appear as the individual intends. Thus, what is needed is an apparatus and/or method to determine which guide curve may affect each interpolated hair that allows the individual more freedom in the placement of the guide curves along the surface of the computer-generated object.

SUMMARY

One implementation may comprise a method for connecting a plurality of points located on a surface of a computer-generated object. The method may comprise the operations of segmenting the surface of the object into at least one recursive shape, the recursive shape comprising at least three corners, associating each of the corners with one of the plurality of points and discarding the recursive shape if all of the corners are associated with the same point. Otherwise, the method may divide the recursive shape into a plurality of smaller recursive shapes comprising at least three corners, associate each of the three corners of the smaller recursive shapes with one of the plurality of points and discarding one or more of the smaller recursive shapes if all of the corners of the smaller recursive shapes are associated with the same point. Otherwise, the method may connect at least two points of the plurality of points if at least two corners of one of the smaller recursive shapes are associated with at least two points to create a connectivity graph for the plurality of points and utilize the connectivity graph to manipulate the object corresponding to the plurality of points.

Another implementation may comprise a computing system comprising a processor and a machine-readable medium having stored thereon data representing sequences of instructions that, when executed by the processor, cause the computing system to perform operations. Such operations may comprise (a) segmenting a surface into at least one geometric shape, (b) assigning a best guide point to each vertex of the geometric shape and (c) if each vertex is assigned to the same guide point, discarding the geometric shape. Otherwise, the operations may include (d) subdividing the geometric shape into a plurality of smaller geometric shapes, (e) assigning a best guide point to each vertex of each of the plurality of smaller geometric shapes, (f) determining whether the size of each of the plurality of smaller geometric shapes is less than or equal to a geometric size value and (g) if the size of each of the plurality of smaller geometric shapes is not less than or equal to the geometric size value, repeating operations (a) through (f). If this is not the case, the operations (h) of connecting at least two guide points assigned to one of the plurality of smaller geometric shapes may be performed to create a connectivity graph and (i) utilizing the connectivity graph to manipulate the surface corresponding to the plurality of points.

Yet another implementation may comprise a computer-readable storage medium, the computer readable storage medium storing a computer-executable code that, when executed by a computer, causes the computer to perform operations. Such operations may comprise segmenting a surface of a computer-generated object into at least one geometric recursive shape, associating a point from a plurality of points on the surface to each vertex of the geometric recursive shape by determining the nearest point to each vertex of the geometric recursive shape and discarding the geometric shape if each vertex is assigned to the same point. Alternatively, the operations may include subdividing the geometric recursive shape into a plurality of smaller geometric recursive shapes, associating a point from the plurality of points to each vertex of the smaller geometric recursive shapes by determining the nearest point to each vertex of the smaller geometric recursive shapes and connecting at least two points of the plurality of points if the at least two points are associated with at least two vertexes of one of the smaller recursive shapes to create a connectivity graph of the plurality of points and utilizing the connectivity graph to manipulate the computer-generated object corresponding to the plurality of points.

DETAILED DESCRIPTION

Figure 1:
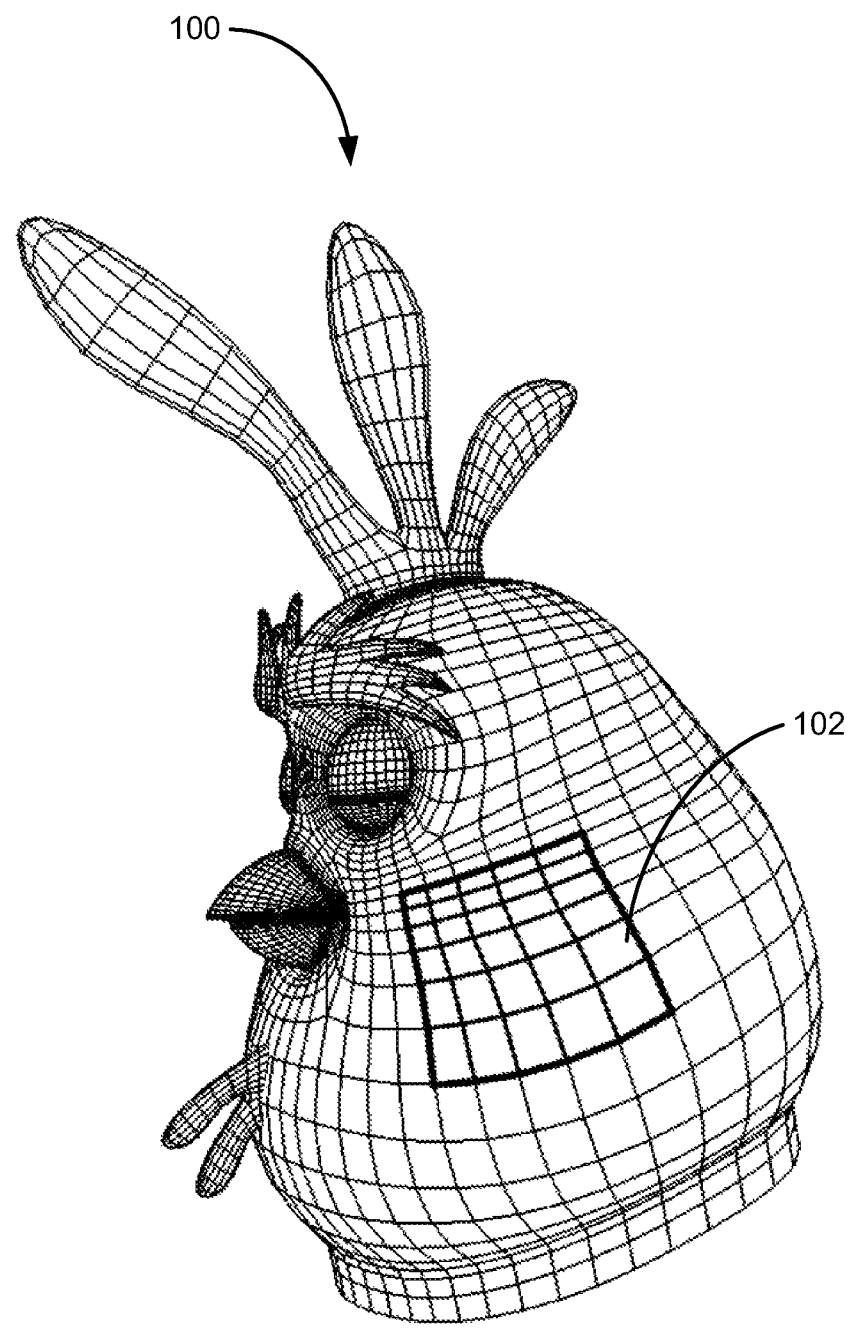
FIG. 1 is a diagram illustrating a computer-generated mesh object on which an interpolated region may be applied.

Implementations discussed herein may involve a method for determining connectivity of a plurality of points on a surface of a computer-generated object in two-dimensional or three-dimensional space. The method may include creating an association diagram of a plurality of association regions related to each point on the surface by a best fit function. In general, the method may utilize a recursion process to determine the boundaries of association regions related to the points on the surface of the object. Once the boundaries of the association regions are determined, the points on the surface may be connected by deriving a connectivity graph for the association diagram. For example, in two-dimensions and where the best fit function is "nearest guide", the association diagram may approximate a Voronoi diagram and the connectivity graph may approximate a Delauny Triangulation of the points.

The recursion process to determine or approximate the association region boundaries related to the points on the computer-generated model may include a first stage of overlaying the surface of the object with one or more recursive shapes and evaluating the shapes to determine a best fit to one of the plurality of points on the surface. Through this evaluation, the embodiment executing the recursion process may determine if any of the recursive shapes lie in more than one association region. Those recursive shapes that lie within a single association region may be discarded while the remaining recursive shapes may be refined into one or more smaller recursive shapes. This refining process may continue until a certain size tolerance or error tolerance for the recursive shapes is achieved. Once the error tolerance is achieved, the boundaries of the association regions may be approximated by the remaining recursive shapes. The recursion process may then proceed to a connection stage wherein the remaining recursive shapes may be analyzed to determine if each such shape lies in one or more association regions. A connection may be created between two or more points on the surface of the object based on the number of regions that each recursive shape indicates. In one example, the connections may approximate a Delauny Triangulation of the points on the surface of the object obtained through the recursion process.

The connectivity information obtained through the embodiment performing the above method may be utilized for several computer-related computations. In one example, points along a surface of the computer-generated object may be connected and utilized in the interpolation process to generate hair or fur along the surface of the object. More particularly, the connected points may represent one or more guide curves placed on the surface of the object by an individual during a creation process to generate hair on the object. In this example, the connectivity information may be utilized to determine an area of influence for each guide curve on the surface. The area of influence for each guide curve may determine which curves apply to each generated hair strand during the interpolation process. Further, due to the parallel nature of the recursion process, the connectivity information may be obtained by a computing system relatively quickly with little to no limit on the placement of the points along the surface of the object.

FIG. 1 is a diagram illustrating a computer-generated mesh object 100 on which a recursion process (as described herein) may be applied to connect a plurality of points located along the surface of the object. While the examples used in the present disclosure discuss the recursion process in relation to this or a similar computer-generated surface, the connectivity process may be utilized to connect any plurality of points along any surface defined by a computer program. In addition, the recursion process is discussed herein primarily as a portion of a process to generate hair or fur along the surface of the mesh object 100 as part of a computer-generated multimedia presentation. However, this may be just one example of a particular use of the connectivity process. For example, the connectivity process may also be utilized to aid in performing topographical modeling, three-dimensional modeling of an object, architectural modeling in a computer-aided design program and so on.

As shown in FIG. 1, the present disclosure may be applied to a surface of an object 100 created by a computing system. The object 100 of FIG. 1 is merely one example of such a surface. In addition, the object 100 may include a hair or fur feature that covers at least a portion of the object generated on the surface through an interpolation process. The placement and look of the fur or hair of the object 100 may be controlled by an individual by placing one or more guide curves along the surface of the object. Once the guide curves are placed, a computing system may perform a recursion process to determine which guide curves control each hair of the interpolation process by connecting the points on the surface that represent the placement of the guide curves and determining an area of influence for each guide curve. In general, any interpolated hair that lies within the area of influence for a guide curve may be affected by the guide curve governing that area. In addition, a single strand of hair or fur may be influenced by any number of guide curves, as desired by the individual.

To begin to determine which guide curves affect each generated hair along the surface of the object 100, points on the surface that represent the placement of each guide curve may be connected through a recursion process. This recursion process is discussed in more detail in relation to FIGS. 5A through 7D. For simplicity, the recursion process is discussed herein as it applies to a portion 102 of the surface of the object 100 of FIG. 1. Although the figures and description discussed below disclose a process to determine connectivity between points on a two-dimensional (2D) surface, it should be appreciated that the process may similarly be applied to a three-dimensional (3D) surface, such as that shown in FIG. 1. Thus, the process described herein may be utilized to connect guide curve location points that may lie across multiple and varying surfaces of the object 100.

Figure 2:
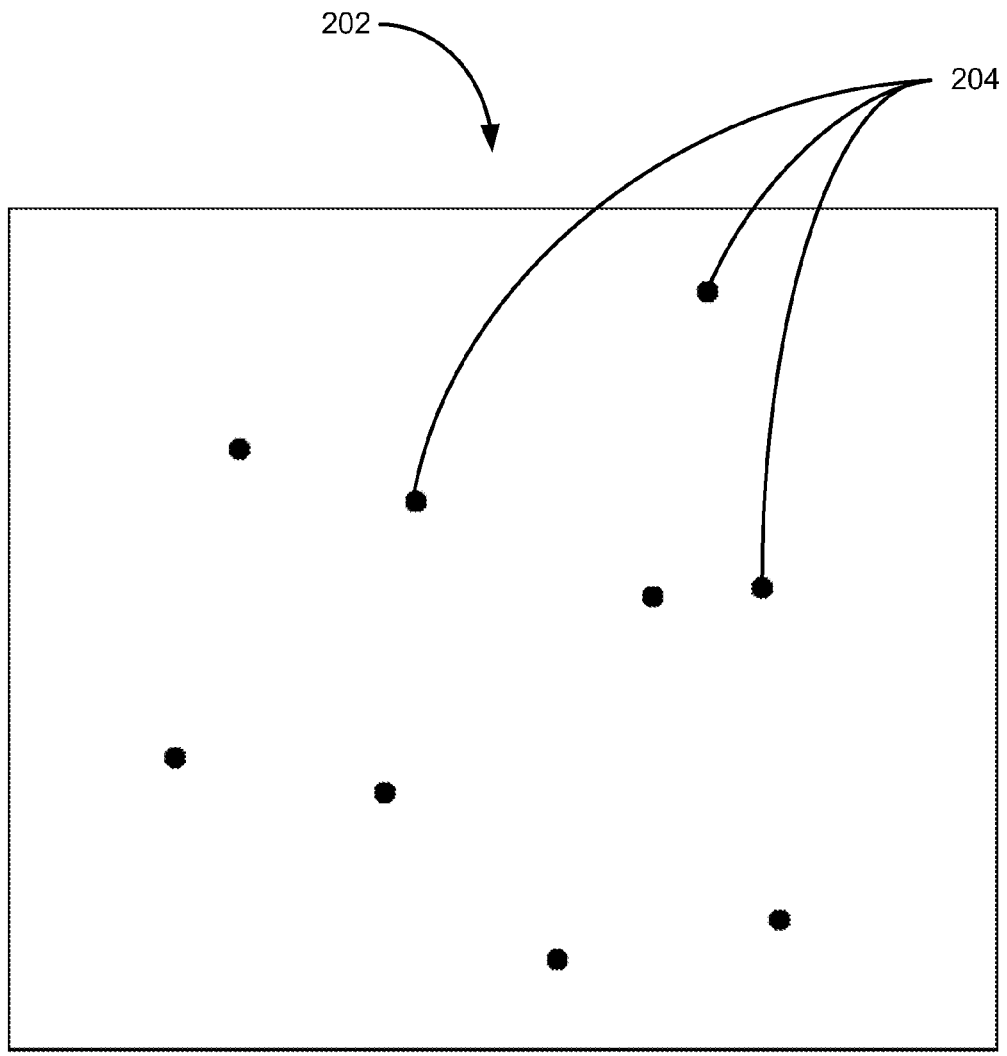
FIG. 2 is a diagram illustrating a representative portion of the object of FIG. 1, including several points indicating locations of one or more guide curves.

FIG. 2 is a diagram illustrating a representative portion 202 of the object 100 of FIG. 1, including several points 204 indicating locations of one or more guide curves along the surface of the object. Although the representative portion 202 of FIG. 2 is shown as a 2D model, the portion may form part of a 3D computer model, such as that shown in FIG. 1. Thus, the representative portion 202 may include a depth component that is not illustrated. The portion 202 also includes several points 204 indicating locations of one or more guide curves placed along the surface of the portion 202 by a creator of the object. Further, it should be appreciated that the embodiments described herein, while described pertaining to the representative portion 202, may be applied to the entire surface of a computer-generated object. Thus, while additional points may be present on the surface of the object that lie outside of the representative portion 202, the embodiments described may include any point located on the surface of the object while performing analysis on the object.

Figure 3:
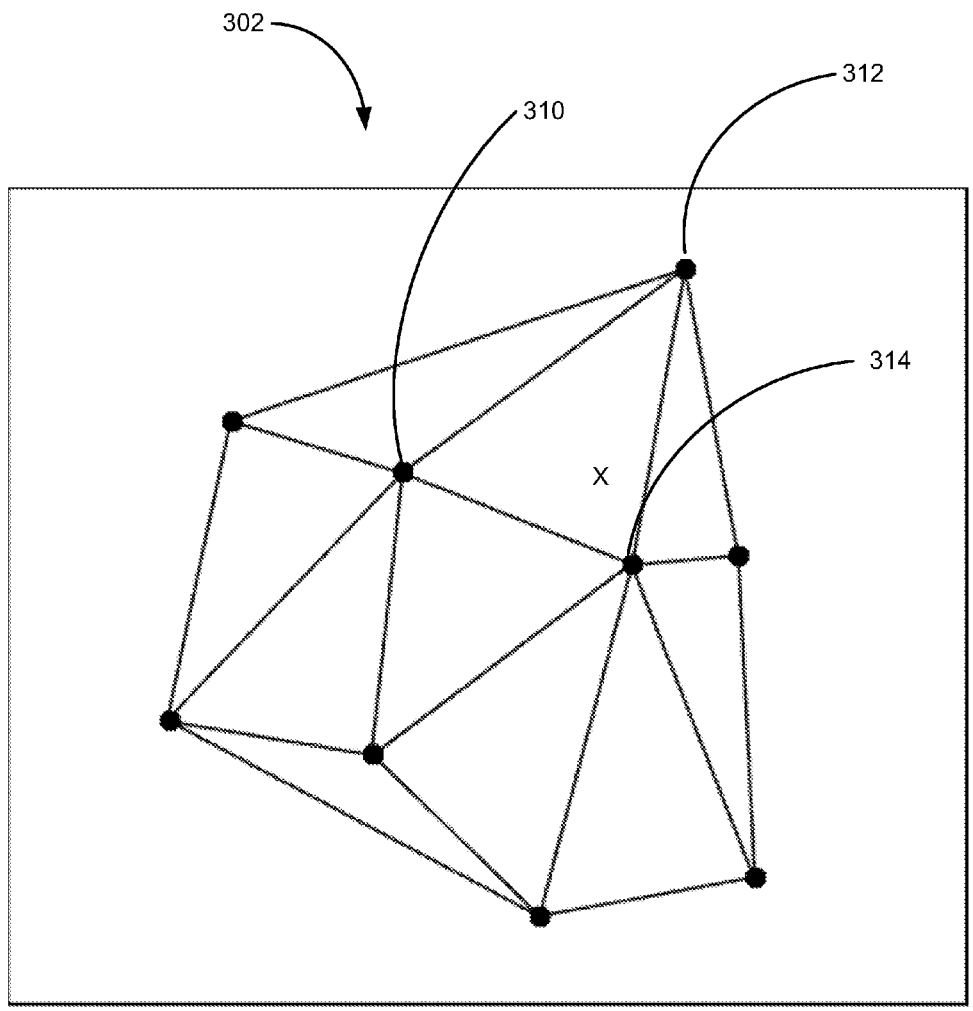
FIG. 3 is a diagram of the representative portion of FIG. 2, further illustrating a Connectivity Graph connecting of the points of the portion.

FIG. 3 is a diagram of a representative portion 302 of a computer-generated model, further illustrating a Delauny triangulation connection of a plurality of points located along the surface of the portion. In general, a Delauny triangulation is a triangulation of a set of points such that no one point lies inside the circumcircle of any triangle created by any three of the set of points. Delauny triangulation tends to maximize the minimum angle of all of the angles of the triangles in the triangulation. A Delauny triangulation is one example of a connectivity graph that may be used when modeling an object in a computer program.

The connectivity graph of a set of points may be used in several applications. In one example, the connection information provided by the connectivity graph of a set of points may be used to determine which guide curves located along a surface of a computer-generated object affect hair generated along the surface. More particularly, a hair strand generated at any position along the surface of the portion 302 may be affected by the three guide curves whose locations define the connectivity triangle within which the hair lies. For example, a hair strand generated at position X in FIG. 3 may have three guide curves that apply to the hair strand, namely guide curve 310, guide curve 312 and guide curve 314. In other words, because the hair strand at position X lies within a connectivity triangle created by those three guide curve locations, the three guide curves indicated by those points may be applied to the orientation of the generated hair strand.

Figure 4:
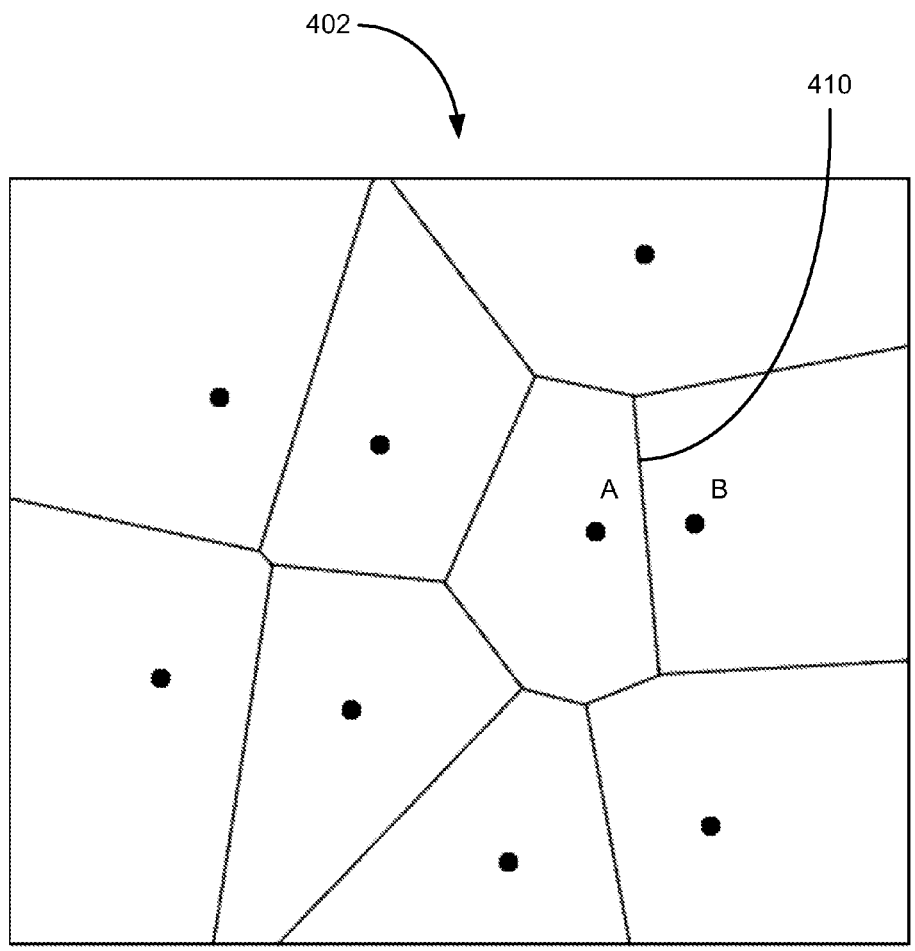
FIG. 4 is a diagram of the representative portion of FIG. 2, further illustrating association regions of the portion.

In this manner, the connectivity graph of a set of guide curve location points along a surface of a computer-generated object may aid in determining which guide curves are applied to a hair strand as the hair is generated along the surface. However, without connectivity information between the points, connectivity graph computations are often both computationally intensive and time consuming, especially in 3D environments where the points may lie across several surfaces of the computer-generated object. One solution is to derive the connectivity graph from an association diagram including a plurality of association regions of the same point locations along the surface. An example of such an association diagram of the collection of points in the representative portion 402 of a computer-generated model is shown in FIG. 4.

In general, the association diagram of a set of points may create a cell or region around each point in the set. In the embodiment where the best fit function is the nearest point, the region boundaries may delineate the boundaries in the plane that are equidistant to the two nearest points in the set. For example, the boundary illustrated by line 410 of FIG. 4 defines the points in plane that is equidistant between point A and point B. In other words, anything to the left of the boundary line 410 lies closer to point A and anything to the right of the boundary line lies closer to point B. Thus, the association regions may define the boundary of the surface that lie equidistant between the points in the collection of points. In general, the association regions may define the boundary of the surface that equally satisfies the best fit function for points in the collection of points.

In addition, the association diagram of a region containing a set of points may be utilized to derive the connectivity graph for the set points within the region. In general, the connectivity graph of any set of points may be generated by connecting points whose association regions are adjacent. Thus, continuing the above example, since boundary line 410 of FIG. 4 defines the association boundary between point A and point B, point A and point B have adjacent association regions. Thus, these points may be connected as part of the connectivity graph of the set of points in the portion 402. Applying this method to each association region across the region 402 may then provide the connectivity graph for that region. Also, the method of deriving the connectivity graph from the association diagram for the region 402 shown may be applied to 3D models by computing the association diagram along the surface of the model and deriving the connectivity graph from those computations. Again, however, such computations are often both computationally intensive and time consuming with conventional means, especially in 3D environments.

FIGS. 5A through 7D illustrate one method to determine the association boundaries for a set of points along a surface of a computer-generated object. Once the association regions are determined, a connectivity graph of the points may be derived to connect the points in the set. This information may be utilized for several purposes, such as, for example, determining which guide curves located on a surface of a computer-generated object may be applied to a strand of hair generated along the surface. In general, the recursion process may be performed by a computing system, such as that shown in FIG. 11.

The recursion process discussed with reference to FIG. 5A through 7D may be separated into three main stages: refining the recursion search, stopping the recursion search and connecting the points based on the results. In general, the refinement operation may recursively search the surface of the computer model for association region boundaries of the set of points, the stopping operation may cease the recursive search when an acceptable tolerance is achieved and the connecting operation may use the determined association region boundaries to connect the series of points on the surface of the model to form a connectivity graph of the points.

Figure 5A:
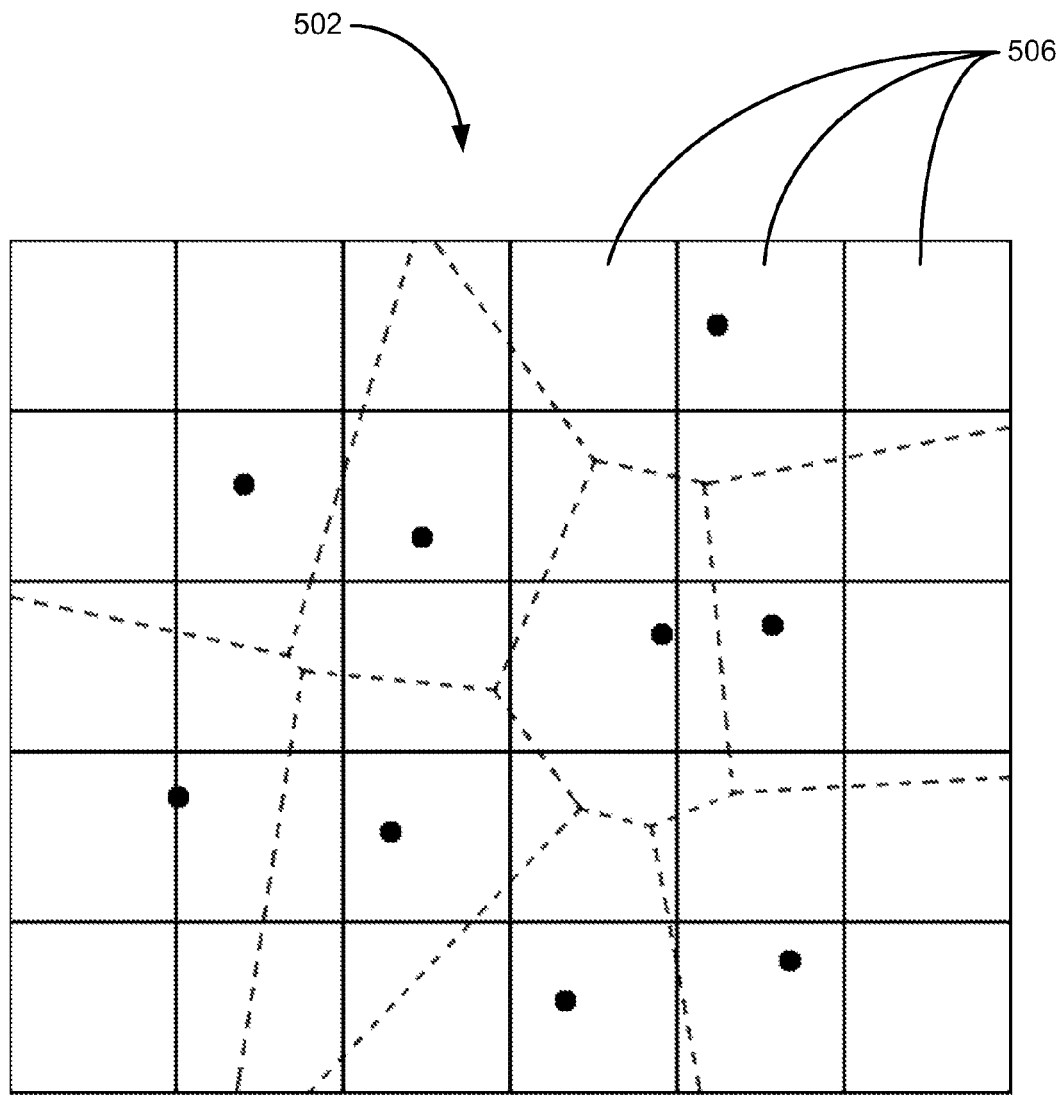
FIG. 5A is a diagram illustrating the representative portion of FIG. 2 overlaid with a grid of recursive boxes to begin determining the boundaries of the association regions of the representative portion.

Beginning with the refinement stage, one or more recursive boxes may be tiled over the surface of the computer-generated model, as shown on the representative portion 502 in FIG. 5A. The portion 502 shown in FIG. 5A may be the same portion shown above in FIGS. 2-4 and may include points on the surface that represent locations of one or more guide curves on the surface of the computer-generated model. However, in this example, a plurality of recursive boxes 506 may overlay the representative portion 502 of the computer-generated model to begin the recursion process to detect the boundaries of the association regions of the portion and connect the points. In addition, the illustrated portion 502 shown in FIG. 5A includes the association region boundaries between the set of points of the region. However, it should be appreciated that these boundaries are included for illustration use only as the embodiments described herein may use the recursion process to approximate and determine these boundaries.

As shown in FIG. 5A, the representative portion 502 of the computer-generated object may be overlaid with a plurality of recursive boxes 506 to begin the refinement operation. While the recursive boxes 506 shown are similar in shape and size, it is not necessary for the recursive boxes to be similar. For example, the recursive boxes 506 may be any size or may include varying sized boxes (such as a large box in one area and smaller boxes in others). In addition, the recursive boxes 506 may take any geometric shape that covers the surface of the object. For example, the recursive boxes 506 may include rectangles, triangles or any other shape that may cover the surface of the computer-generated object. Further, in one example, the recursive boxes 506 may include a single box that overlays the entire region or a portion of the region. For example, the edges of the representative portion 502 shown in FIG. 5A may be considered the recursive box 506 for the shown portion. In general, the recursive boxes 506 for the object may be any size and shape that overlays the surface of the object.

Figure 5B:
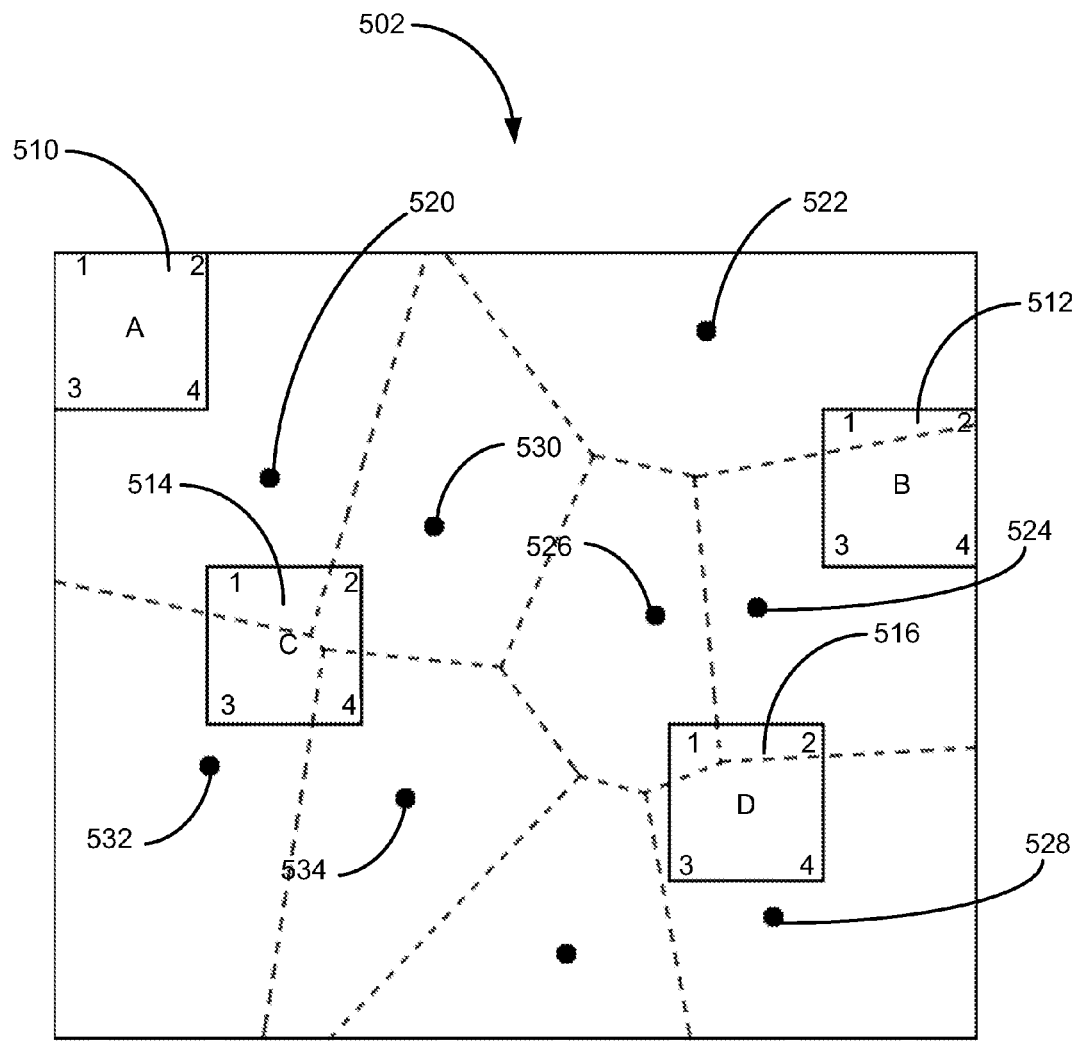
FIG. 5B is a diagram illustrating the representative portion of FIG. 2 overlaid with four selected recursive boxes, as part of an operation to begin determining the boundaries of the association regions of the representative portion.

FIG. 5B is a diagram illustrating the representative portion 502 of FIG. 5A overlaid with four representative recursive boxes to begin determining the boundaries of the association regions of the portion. In general, the representative portion 502 of FIG. 5B is the same as that shown in FIG. 5A. However, in FIG. 5B, only four of the recursive boxes are shown to simplify the illustration of the recursion process performed to determine the association region boundaries of the portion 502. Recursive box A 510, recursive box B 512, recursive box C 514 and recursive box D 516 are similar to the recursive boxes shown in FIG. 5A.

To begin the refinement stage of the recursion process, a computing system may first analyze the corners of each recursive box 506 on the surface of the object to determine which Association region each corner lies in. This analysis may be performed by finding the best fit from the set of points that each corner of the recursive box 506 lies nearest. In one embodiment, the best fit point to any one corner may be indicated as the nearest point and determined by computing the distance along the surface of the object to the nearby points in the set and noting the point with the shortest distance to the corner. Further, for a 3D model, only those points that lie on the same side as the recursive box are typically considered. In general, if the corners of the recursive box 506 are near two or more points, than a Association region boundary runs through that box and further recursion analysis may be performed. Otherwise, if all four corners of the recursive box 506 are near the same point, then the computer system may determine that the recursive box lies entirely within a Association region of the portion 502 of the object. In this case, the recursive box may be discarded as no region boundary passes through that box.

FIG. 5B includes several examples of the process of analyzing the corners of the recursive boxes 506 in relation to the set of points along the surface of the object. For example, the computing system may evaluate recursive box A 510 to determine which points are nearest the four corners of the box. In this case, the nearest point for all four corners of recursive box A 510 is point 520. This may be determined by the computing system by analyzing the distance along the surface of the computer-generated model to a sample of the nearest points to recursive box A 510. As shown, point 520 of the representative portion 502 is the nearest point for all four corners of recursive box A 510. Thus, because all four corners of recursive box A 510 lie closest to point 520, the computing system may determine that recursive box A 510 lies entirely within an association region of the representative portion 502 and, thus, may discard the this box since no region boundary passes through this recursive box.

Alternatively, analysis of recursive box B 512 may indicate that at least one association region boundary passes through that box. More particularly, the computing system may analyze the corners of recursive box B 512 (similar to that performed on recursive box A) and determine that corners "1" and "2" of box B lie closest to point 522 and corners "3" and "4" of box B lie closest to point 524. Thus, because two or more corners of recursive box B 512 lie nearest to at least two different points on the surface of the object, the computing system may conclude that at least one association region boundary passes through recursive box B 512 (as shown in FIG. 5B). As a result, the computing system may determine that recursive box B 512 may require more refinement to further locate the region boundary passing through the box.

Similarly, an analysis of recursive box D 516 may also indicate the presence of at least one region boundary passing through the box. More particularly, the computing system may determine that point 526 lies closest to corner "1" of recursive box D 516, point 524 lies closest to corner "2" and point 528 lies closest to corners "3" and "4" of box D. A similar analysis may indicate that the four corners of recursive box C 514 each lie nearest a different point. More particularly, corner "1" of recursive box C 514 lies nearest point 520, corner "2" lies nearest point 530, corner "3" lies nearest point 532 and corner "4" lies nearest point 534. Thus, the computing system may determine that at least one association region boundary passes through both recursive box C 514 and recursive box D 516 such that these boxes may be refined to locate the region boundaries passing through these boxes.

In general, the computing system may perform a best point or best fit to associate a corner of the recursion shape to a point on the surface of the object. In one embodiment, the best fit may be the nearest point analysis to associate the corners of the recursive boxes to points along the surface of the object, as described in relation to FIG. 5B. In another embodiment, the best fit may include locating the nearest guide, but then applying a penalty derived from relating the surface normal of the guide to the corner in question. A guide would be penalized as it approaches "the other side" and fully eliminated when it is on the other side of the object. Another best fit embodiment may involve putting the guides into "sets". Any of the previously discussed may be used to assign an initial value to each corner and one corner is deemed the "best" fit of all corners. The other corners may then be checked to make sure that their associated guide is from the same set as the best one. This may ensure that all corners are associated with guides from the same set and connections are within a single set of guides. In general, any method of associating the corners of the recursive shapes with one or more of the points, either known or hereafter developed, may be used in conjunction with the embodiments described herein.

In addition, the operations described with relation to FIG. 5B may be the first iteration of the refinement stage; that continued refinement of the recursive boxes may provide a more detailed determination of the location of the region boundaries for the association regions of the points on the surface of the object. For example, FIGS. 6A-6E are diagrams illustrating additional iterations of the recursion stage of parsing a recursive box and removing one or more of the parsed boxes to locate the boundaries of the association regions of a representative portion 602 of a computer-generated object. In general, the diagrams of FIGS. 6A-6E illustrate a progressive refinement of a recursive box similar to recursive box C of FIG. 5B.

Figures 6A, 6B:
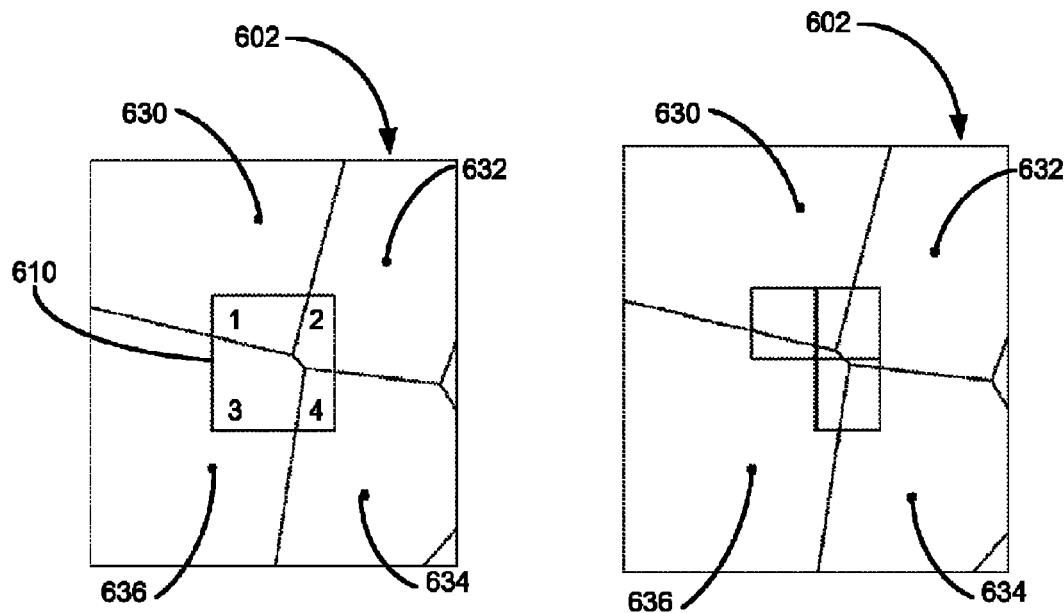
FIG. 6A is a diagram illustrating a representative recursion box overlaying four association regions defined by four points within the representative portion, as part of an operation to begin determining the boundaries of the association regions of the representative portion.
FIG. 6B is a diagram illustrating a first iteration of dividing the recursion box shown in FIG. 6A and discarding the lower leftmost of the divided recursion boxes that lie within a single association region based on an analysis of the corners of the divided boxes.

FIG. 6A illustrates an initial starting recursive box 610 similar to recursive box C of FIG. 5B wherein the four corners of the starting recursive box each lie in a separate region as suggested by the distance of the corners to the four separate shown points (points 630 through 636). Thus, because the initial starting recursive box 610 includes at least two corners that lie in separate regions, the recursive box may be further refined through an iteration of the refinement stage.

The first iteration of the refinement of the initial recursive box 610 is illustrated in FIG. 6B. In general, iterations of the refinement stage may include dividing the recursive box into smaller boxes, such as into its four quadrants in one embodiment. Upon the division, the above operation of determining which region each corner of the refined recursive boxes may be applied to the divided boxes to again determine whether further refinement may be performed. As illustrated in FIG. 6B, the refined recursive box in the lower left position has corners that all lie within the same region (in other words, each corner is closer to point 636 than to any other point). As a result, the refined recursive box in the lower left position may be discarded such that no further recursion analysis may be performed on this box. The remaining boxes shown in FIG. 6B, however, may be further refined through a similar iteration of the refinement stage.

Figure 6C:
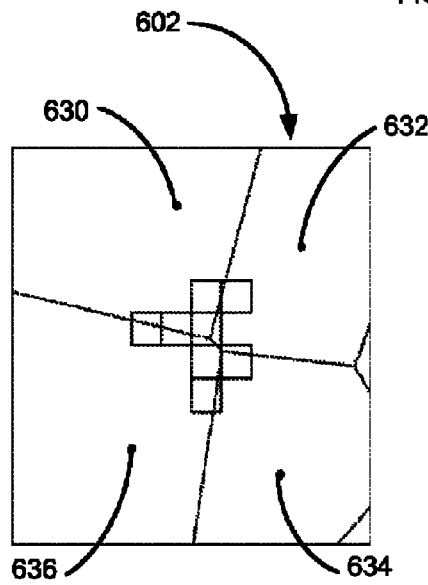
FIG. 6C is a diagram illustrating a second iteration of dividing the recursion box, further dividing the recursion boxes shown in FIG. 6B, and discarding those divided recursion boxes that lie within a single association region based on an analysis of the corners of the divided boxes.

FIG. 6C illustrates an additional iteration of the refinement stage of the recursive boxes illustrated in FIG. 6B. In this example, the remaining refined boxes of FIG. 6B may again be divided into quadrants and an analysis of the corners of the divided boxes may be performed. Further, in this iteration, the computing system may determine that some of the boxes include four corners that lie within a single region. Further, if it is determined that the four corners of a box lie in a single region, that box may not be refined further and may subsequently be discarded. For example, as shown in FIG. 6C, each recursive box wherein the four corners of the box lie in the same region (such as the upper left divided box) are discarded and removed from the figure. Therefore, the remaining boxes shown in FIG. 6C have at least two corners that lie in separate regions and may be refined further through additional iterations of the refinement stage.

Figure 6D:
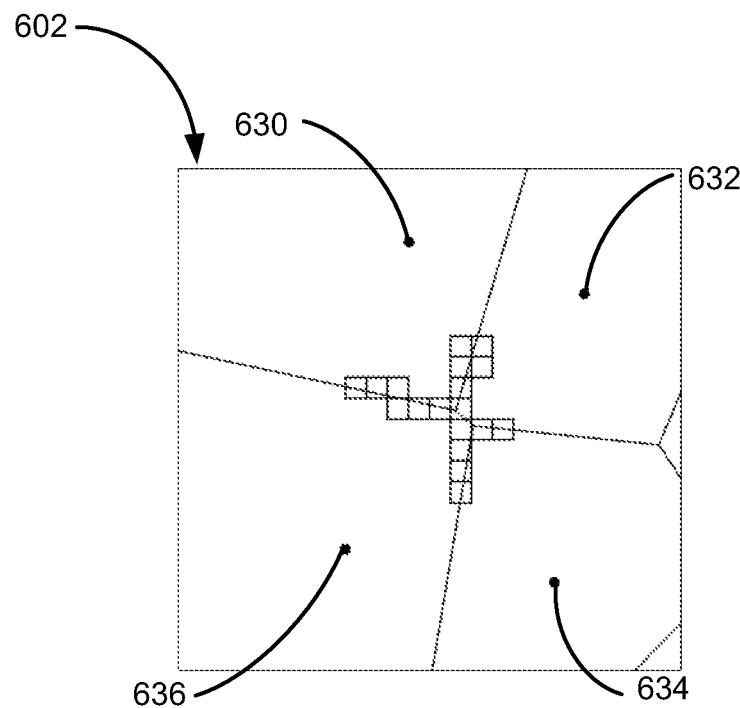
FIG. 6D is a diagram illustrating a third iteration of dividing the recursion box, further dividing the recursion boxes shown in FIG. 6C, and discarding those divided recursion boxes that lie within a single association region based on an analysis of the corners of the divided boxes.
Figure 6E:
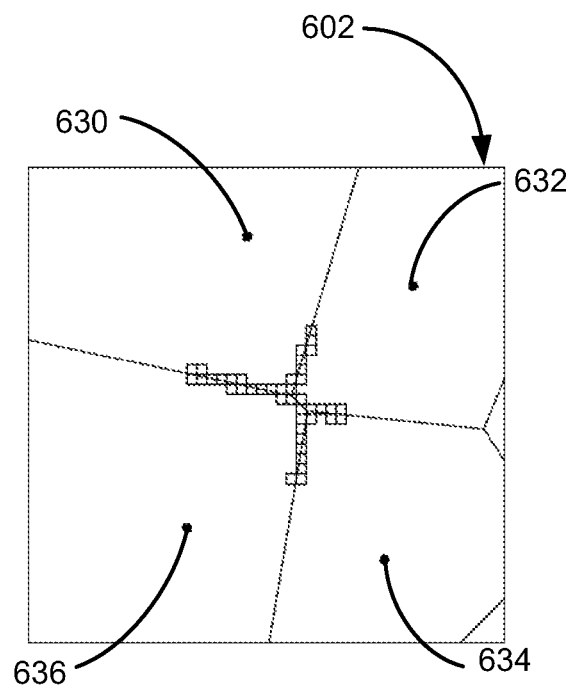
FIG. 6E is a diagram illustrating a fourth iteration of dividing the recursion box, further dividing the recursion boxes shown in FIG. 6D, and discarding those divided recursion boxes that lie within a single association region based on an analysis of the corners of the divided boxes.

FIGS. 6D and 6E show further iterations of the refinement stage of dividing the recursive boxes into quadrants, analyzing the corners of the refined boxes and discarding those boxes that have constant corners. As shown, the refinement stage begins to focus the remaining recursive boxes along the boundaries of the association region such that the boundaries may begin to be identified as the refinement stage parses down the boxes onto the boundaries. In particular, after the five iterations of the refinement stage illustrated, the remaining recursive boxes may begin to delineate the association region boundaries for the set of points in the portion 602 of the surface of the computer-generated object.

Figure 7A:
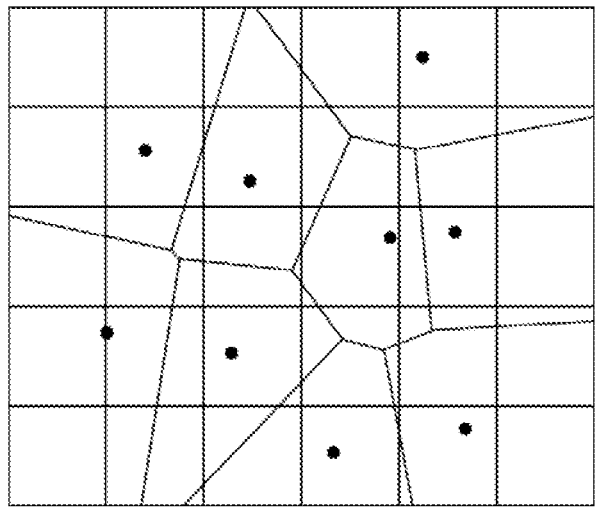
FIG. 7A is a diagram illustrating several representative recursion boxes overlaying the representative portion of FIG. 2, as part of an operation to begin determining the boundaries of the association regions of the representative portion.
Figure 7B:
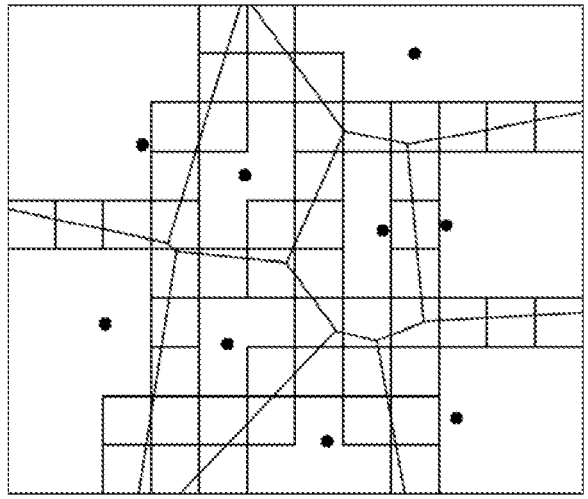
FIG. 7B is a diagram illustrating a first iteration of dividing the recursion boxes shown in FIG. 7A and discarding those divided recursion boxes that lie within a single association region based on an analysis of the corners of the divided boxes.
Figure 7C:
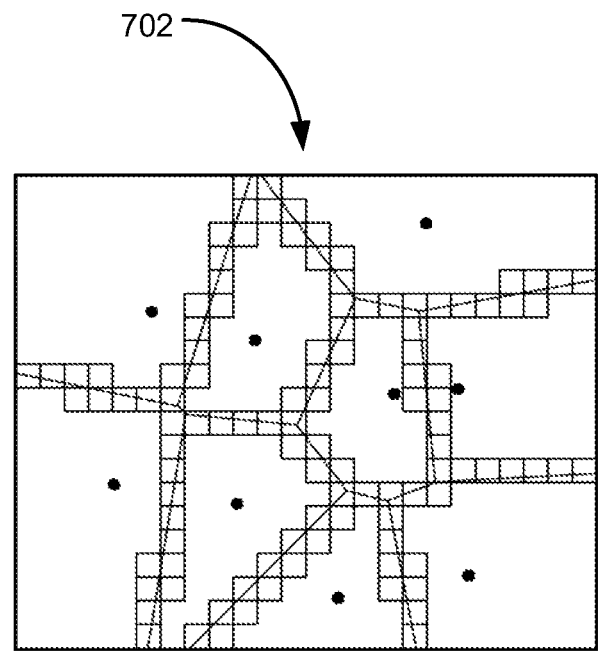
FIG. 7C is a diagram illustrating a second iteration of dividing the recursion boxes, further dividing the recursion boxes shown in FIG. 7B, and discarding those divided recursion boxes that lie within a single association region based on an analysis of the corners of the divided boxes.
Figure 7D:
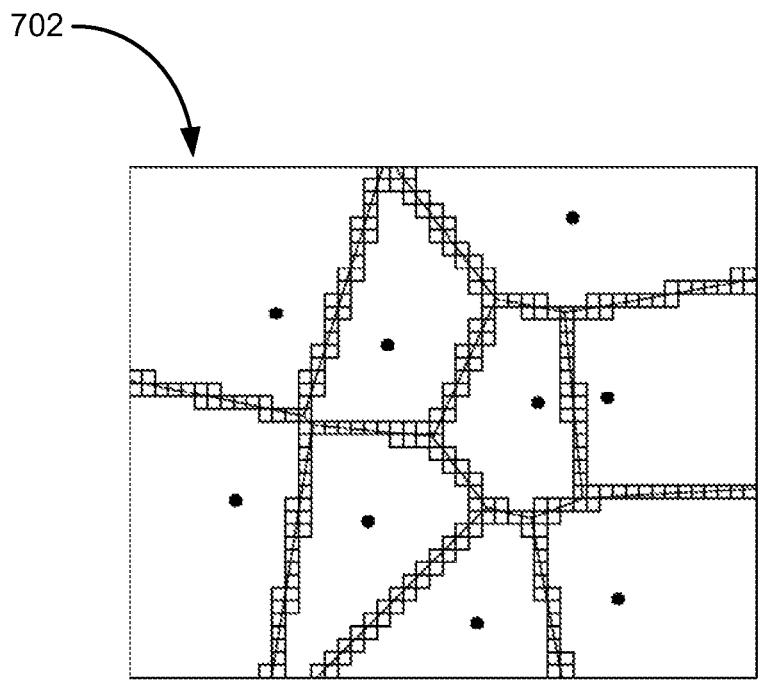
FIG. 7D is a diagram illustrating a second iteration of dividing the recursion boxes, further dividing the recursion boxes shown in FIG. 7C, and discarding those divided recursion boxes that lie within a single association region based on an analysis of the corners of the divided boxes.

While FIGS. 6A through 6E illustrate the refinement stage for a single recursive box, FIGS. 7A-7D are diagrams illustrating several iterations of the recursion stage applied to several recursive boxes overlaying the representative portion 702 of the computer-generated object. As shown in FIG. 7D, the result of several iterations of the refinement stage may focus the recursive boxes along the association region boundaries of the representative portion 702 so that the boundaries may be approximated or otherwise identified. In a similar manner, the refinement stage may be applied to the entire surface of the computer-generated object as demonstrated in FIGS. 7A through 7D.

The second stage of the recursion process may be stopping the iterations of the refinement of the recursive boxes at an acceptable error tolerance. Theoretically, the refinement stage may continue indefinitely given enough precision in the computations as the recursive boxes are refined finer along the association region boundaries. However, the computing system may also retain an acceptable error tolerance such that, when the recursive boxes get below a determined size, the iterations of the refinement stage may cease and the recursion process may continue to the connecting stage. In general, the tolerance value (or smallest determined size of the recursive boxes) may be determined by the computing system based on the desired level of detail for the association boundaries. In other words, the refinement stage iterations may continue until all of the desired association region boundaries, within error tolerances, are detected by the recursion process. In one embodiment, the acceptable error tolerance may be provided by a user of the computing system to the computer program performing the recursion process. In another embodiment, the computing system itself may determine the error tolerance based on an analysis of the computer-generated object, such as by determining the distance between two points that lie near each other on the surface and calculating the smallest recursive box needed to detect the association region boundary that lies between those two points. In general, however, the error tolerance may be calculated by the computing system in any manner known or hereafter developed.

One example of the stopping stage operation is illustrated in FIGS. 6A through 6E. More particularly, the small association boundary edge located in the center of the recursive box 610 of FIG. 6A indicates that the point 636 should be connected to point 632 by the recursion process, since these points share a association region boundary. On the other hand, point 634 should not be connected to point 630 since there is no common boundary between these points. However, if the error tolerance were given or calculated at a high enough value, the small segment of the boundary in the center of the region 602 may not be detected (such as if the error tolerance stopped in FIG. 6A). In such a case, all four points may be connected upon completion of the recursion process. In some instances, this error may be acceptable to the overall computation to determine the association regions since some association region boundaries may be so small as to provide little difference between the connected points. In this manner, the error tolerance value may determine what is defined as an association region boundary for connectivity of the points.

The final stage of the recursion process to detect the association regions of the computer-generated object may be to connect the points located along the surface of the object based on the estimated association region boundaries. In general, once the refinement stage has ceased based on the allowed error value, a plurality of recursive boxes (or other polygons) may remain that have differing values on at least two corners. Each recursive box may have two, three or four different values (or, in other words, are located near two, three or four different points on the surface). For those embodiments that utilize a recursive shape other than a box, each recursive shape may have up to n number of different values, wherein n equates to the number of corners for the recursive shape used. For example, a pentagon may include up to five differing values. Therefore, the use of the term "box" should be understood to encompass any polygon having three or more sides.

To connect the points, the computing system may insert a connection for each combination of value of each remaining recursive box in the connecting stage. For example, returning to FIG. 5B, recursive box B 512 may represent a refined box that remains once the refinement stage has ceased. In the example shown, recursive box B 512 includes two values, as corners "1" and "2" of box B are nearest point 522 and corners "3" and "4" are nearest point 524. In this case, the computing system may determine that two values are present for recursive box B 512 and may, therefore, connect point 522 to point 524 as these points represent the differing values at the corners of recursive box B. In addition, this connection may correspond to a portion of the connectivity graph of the points on the surface of the object, specifically part of the connectivity graph that includes point 522 and point 524.

Similarly, recursive box D 516 may also illustrate a refined box that has three values corresponding to the corners of the box. More particularly, point 526 lies closest to corner "1" of recursive box D 516, point 524 lies closest to corner "2" and point 528 lies closest to corners "3" and "4" of box D. In the case where the refined boxes may have three values, three connections may be created. More particularly, point 526 may be connected to point 524 (corresponding to the differing values between corner "1" and corner "2" of box D 516), point 526 may be connected to point 528 (corresponding to the differing value between corner "1" and the value of corners "3" and "4") and point 524 may be connected to point 528 (corresponding to the differing value between corner "2" and the value of corners "3" and "4"). Again, these connections may correspond to a portion of the connectivity graph of the points on the surface of the object. Further, as may be observed, each connection may pass through the association region boundary that separates the points as determined by the recursion process.

Refined boxes that may include four differing values corresponding to the four corners of the box may be illustrated by recursive box C 514. In one example, five connections may be made between the four identified points. More particularly, point 520 may be connected to point 530 (corresponding to the differing values between corner "1" and corner "2" of box C 514), point 520 may be connected to point 532 (corresponding to the differing values between corner "1" and corner "3"), point 532 may be connected to point 534 (corresponding to the differing values between corner "3" and corner "4"), point 534 may be connected to point 530 (corresponding to the differing values between corner "4" and corner "2") and one diagonal may be connected through the box, either from point 520 to point 534 (corresponding to the differing values between corner "1" and corner "4") or from point 530 to point 532 (corresponding to the differing values between corner "2" and corner "3"). In another embodiment, where triangulation is not desired, both diagonals may be connected for a recursive box having four different values at the corners, totaling six connections. In general, the connection stage approximates the connectivity graph connection for any set of points along a surface of a computer-generated object. Thus, at the completion of the connecting stage, the points on the surface of the computer-generated object may be connected in a manner that approximates the connectivity graph of the points, similar to that shown in FIG. 3.

Figure 8:
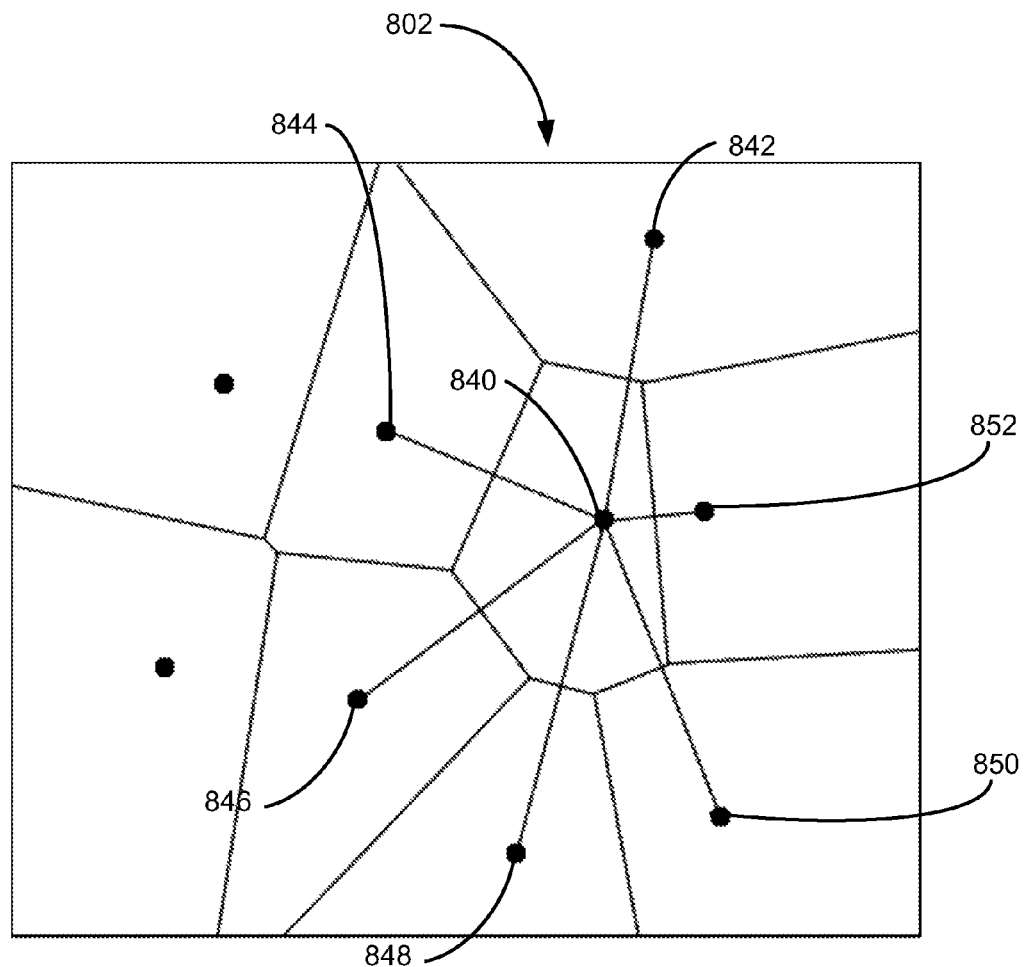
FIG. 8 is a diagram of the representative portion of FIG. 2 wherein one or more of the guide curve locations are connected based on the association region boundaries determined through the recursion process.
Figure 9:
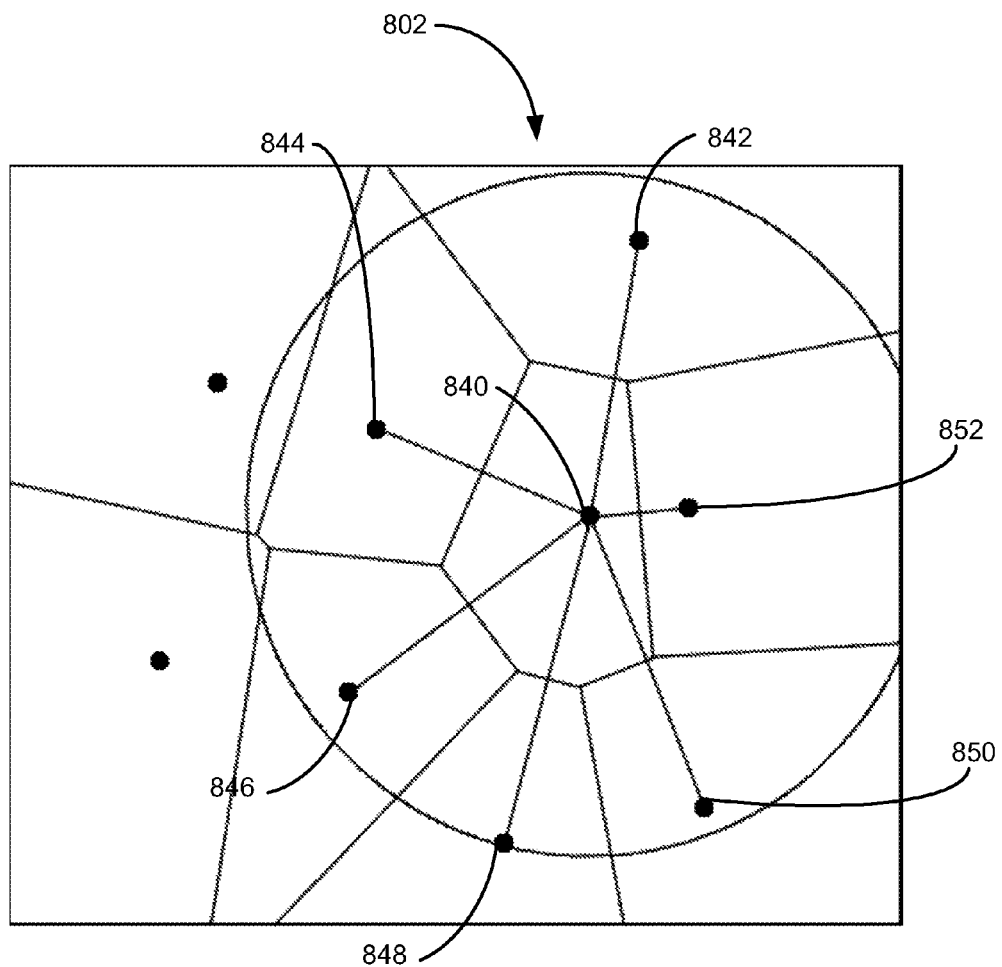
FIG. 9 is a diagram of the representative portion of FIG. 8 wherein the connected guide curve locations are utilized to determine a radius of interest for a particular guide curve.
Figure 10:
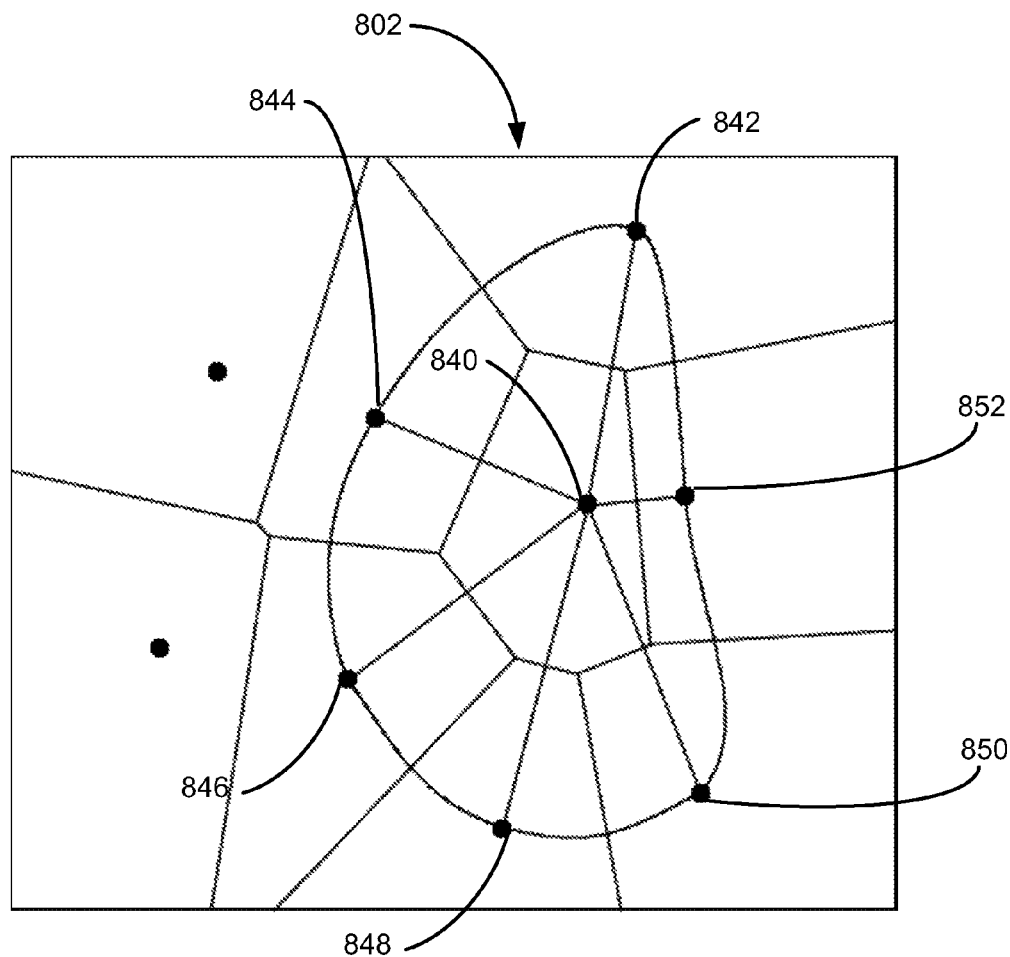
FIG. 10 is a diagram of the representative portion of FIG. 8 wherein the connected guide curve locations are utilized to determine an area of influence for a particular guide curve.

In one embodiment, the connectivity information for the points on the surface of the object obtained through the recursion process may be utilized to define an area of influence, or neighborhood, for each guide curve located on the surface as those guide curves relate to generated hair or fur on the object. The operation of determining an area of influence for a guide curve is illustrated in FIGS. 8 through 10. It should be appreciated, however, that defining the area of influence for a guide curve is but one utilization of the connectivity information obtained through the recursion process described herein.

FIG. 8 is a diagram of a representative portion 802 of a computer-generated object wherein one or more of guide curve locations are connected based on the association region boundaries determined through a recursion process described herein. In general, the connections illustrated in FIG. 8 may be the result of the recursion process to determine which points on the surface of the object connect to point 840. More particularly, based on the association region boundaries detected by the recursion process, point 840 may be connected to points 842-852. As may be noted, the association region surrounding point 840 shares one and only one border with each point to which point 840 is connected.

To begin to determine an area of influence for the guide curve located at point 840, a computing system may analyze each connection relating to point 840 to determine which connection is the longest. In the example shown, the connection between point 840 and 848 is the longest connection. This connection may be termed the radius of interest, as shown in FIG. 9. In general, this radius of interest may determine the area in which any interpolated hair may potentially be affected by that guide curve. Thus, when growing a hair or fur strand along the surface of the computer-generated object through the interpolation process, the computing system may quickly discard any guide curve that does not include a radius of interest that overlays the position of the growing hair. This process may prune the potential guide curves applied to any one hair strand and may not imply that any one guide curve will affect the final interpolation of the fur or hair strand.

The final area of influence may lie within the radius of interest but may also need to compensate for surface curvature between connected guide locations. Each connection may be expressed as a vector which may then be corrected to be in the same plane formed by the surface normal of the center guide location, namely point 840 in this example. These vectors may then be interpolated as a sweep between the connection lines, as shown in FIG. 10. In general, the 3D blobby shape illustrated in FIG. 10 defines the area of influence for the guide located at point 840.

When growing a hair or fur strand along the surface of the computer generated object through the interpolation process, the computing system may use only those guides who's area of influence overlays the hairs position on the surface. In other words, the position of the hair strand on the surface of the object may be analyzed to determine which areas of influence also occupy that position. The computing system may apply different weights to each guide curve associated with the overlaying areas of interest to further refine the affect of each guide curve on the hair strands. In addition, by sweeping the connection lines (forming the curved outline around the area of influence), a hair interpolated along the edges of the connection graph may lie in several areas of influence, thereby reducing the seams or creases that may occur along the graph edges.

The recursion process described herein may find connectivity between points along the surface of a computer-generated object wherein such points may represent position of guide curves used to created hair or fur on the object surface. The points may be unordered and unstructured and may lie in 3D space across multiple surfaces. The point densities may be random, such as lying on a plurality of faces and need not be tied to the geometric representation of the object. Further, because each recursive box may be refined independently of the other boxes, every recursive box tiled along the surface of the object may be launched in separate, simultaneous computation threads. Thus, the parallelism nature of the recursion process may allow the computing system to perform the iterative algorithms faster than those processes that compute linearly.

Figure 11:
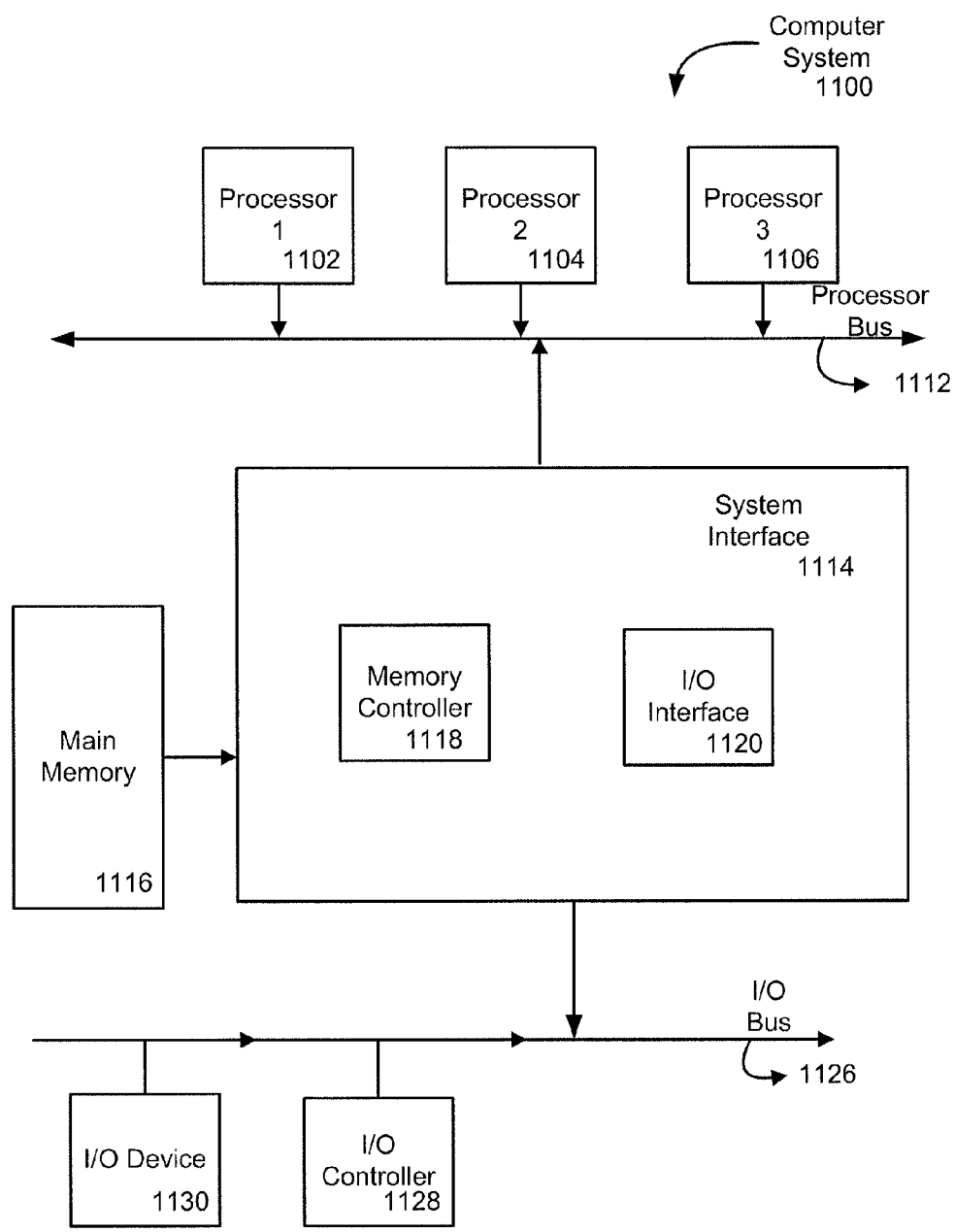
FIG. 11 is a block diagram illustrating an exemplary computer system which may be used in implementing embodiments of the present disclosure.

FIG. 11 is a block diagram illustrating an example of a computer system 1100 which may be used in implementing embodiments of the present disclosure. The computer system (system) may include one or more processors 1102-1106. Processors 1102-1106 may include one or more internal levels of cache (not shown) and a bus controller or bus interface unit to direct interaction with the processor bus 1112. System interface 1114 may be connected to the processor bus 1112 to interface other components of the system 1100 with the processor bus 1112. For example, system interface 1114 may include a memory controller 1118 for interfacing a main memory 1116 with the processor bus 1112. The main memory 1116 typically includes one or more memory cards and a control circuit (not shown). System interface 1114 may also include an input/output (I/O) interface 1120 to interface one or more I/O bridges or I/O devices with the processor bus 1112. One or more I/O controllers and/or I/O devices may be connected with the I/O bus 1126, such as I/O controller 1128 and I/O device 1130, as illustrated.

I/O device 1130 may also include an input device (not shown), such as an alphanumeric input device, including alphanumeric and other keys for communicating information and/or command selections to the processors 1102-1106. Another type of user input device includes cursor control, such as a mouse, a trackball, or cursor direction keys for communicating direction information and command selections to the processors 1102-1106 and for controlling cursor movement on the display device.

System 1100 may include a dynamic storage device, referred to as main memory 1116, or a random access memory (RAM) or other devices coupled to the processor bus 1112 for storing information and instructions to be executed by the processors 1102-1106. Main memory 1116 also may be used for storing temporary variables or other intermediate information during execution of instructions by the processors 1102-1106. System 1100 may include a read only memory (ROM) and/or other static storage device coupled to the processor bus 1112 for storing static information and instructions for the processors 1102-1106. The system set forth in FIG. 11 is but one possible example of a computer system that may employ or be configured in accordance with aspects of the present disclosure.

According to one embodiment, the above techniques may be performed by computer system 1100 in response to processor 1104 executing one or more sequences of one or more instructions contained in main memory 1116. These instructions may be read into main memory 1116 from another machine-readable medium, such as a storage device. Execution of the sequences of instructions contained in main memory 1116 may cause processors 1102-1106 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1116. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A computer-implemented method of connecting a plurality of points located on a surface of a computer-generated object, the method comprising one or more processors performing operations comprising:
   segmenting the surface of the object into at least one recursive shape, the recursive shape comprising at least three corners;
   associating each of the at least three corners with one or more of the plurality of points;
   discarding the recursive shape if each of the at least three corners are associated with the same point;
   otherwise, dividing the recursive shape into a plurality of smaller recursive shapes comprising at least three corners;
   associating each of the at least three corners of the smaller recursive shapes with one or more of the plurality of points;
   discarding one or more of the smaller recursive shapes if each of the at least three corners of the smaller recursive shapes are associated with the same point;
   otherwise, connecting at least two points of the plurality of points if at least two corners of one of the smaller recursive shapes are associated with the at least two points to create a connectivity graph for the plurality of points; and
   utilizing the connectivity graph to manipulate the object corresponding to the plurality of points; wherein the plurality of points do not define the at least three corners of the recursive shape.

2. The computer-implemented method of claim 1 further comprising:
   receiving an error tolerance value associated with a size of a recursive shape; and
   if the smaller recursive shape if the size is greater than the error tolerance value,
   further dividing the smaller recursive shapes;
   associating each of the further divided smaller recursive shapes with one or more of the plurality of points.

3. The computer-implemented method of claim 2 wherein the error tolerance value is received from an operator of a computing device implementing the method.

4. The computer-implemented method of claim 1 wherein the associating operation further comprises:
   determining the nearest point from the plurality of points to the each of the at least three corners of the recursive shape.

5. The computer-implemented method of claim 1 wherein the associating operation comprises:
   selecting a best point from the plurality of points for each of the at least three corners of the recursive shape based on the location of each point on the surface of the object.

6. The computer-implemented method of claim 1 wherein the connecting operation comprises:
   connecting at least two points for each number of associations for each of the corners for every one of the smaller recursive shapes.

7. The computer-implemented method of claim 6 wherein the connecting operation further comprises:
   wherein the number of associations for the corners of one of the smaller recursive shapes equals six, establishing five connections between the associated points.

8. The computer-implemented method of claim 1 wherein the recursive shape is a rectangle comprising four corners and the dividing operation comprises:
   dividing the rectangle recursive shape into four quadrants.

9. The computer-implemented method of claim 1 further comprising:
   calculating an area of influence for each point of the plurality of points by the operations of:
   determining the longest connection for at least one point;
   establishing a radius of interest around the at least one point with a circumference approximate to the longest connection; and
   interpolating a sweep between the connection lengths for each connection of the at least one point.

10. The computer-implemented method of claim 9 wherein the plurality of points indicate locations of guide curves along the surface.

11. The computer-implemented method of claim 10 wherein the area of influence for each guide curve is analyzed to determine the behavior of computer-generated hair strands located on the surface of the computer-generated object.

12. A computing system comprising:
    a processor; and
    a machine-readable medium having stored thereon data representing sequences of instructions that, when executed by the processor, cause the computing system to perform operations comprising:
    (a) segmenting a surface into at least one geometric shape;
    (b) assigning a best guide point to each vertex of the geometric shape;
    (c) if each vertex is assigned to the same guide point, discarding the geometric shape, otherwise;
    (d) subdividing the geometric shape into a plurality of smaller geometric shapes;
    (e) assigning a best guide point to each vertex of each of the plurality of smaller geometric shapes;
    (f) determining whether the size of each of the plurality of smaller geometric shapes is less than or equal to a geometric size value;

(g) if the size of each of the plurality of smaller geometric shapes is not less than or equal to the geometric size value, repeating operations (a) through (f), otherwise

[(h) connecting at least two guide points assigned to one of the plurality of smaller geometric shapes to create a connectivity graph; and (i) utilizing the connectivity graph to manipulate the surface corresponding to the plurality of points; wherein the guide points do not define the vertices of the geometric shape.

13. The computing system of claim 12 wherein the sequence of instructions cause the computing system to further perform the operation of:

if the size of each of the plurality of smaller geometric shapes is greater than the geometric size value, discarding each smaller geometric shape where each vertex of the smaller geometric shape is assigned to the same guide point.

14. The computing system of claim 12 wherein assigning a best guide point to each vertex of the geometric shape comprises determining the nearest guide point to the vertex of the geometric shape.

15. The computing system of claim 12 wherein connecting guide points comprises connecting two guide points for each number of assignments for every one of the smaller geometric shapes.

16. The computing system of claim 12 wherein the sequence of instructions cause the computing system to further perform the operation of:

calculating an area of influence for each guide point by the operations of:

determining the longest connection for at least one guide point;

establishing a radius of interest around the at least one guide point with a circumference approximate to the longest connection; and interpolating a sweep between the connection lengths for each connection of the at least one guide point.

17. A non-transitory computer-readable storage medium, the computer readable storage medium storing a computer-executable code that, when executed by a computer, causes the computer to perform:

segmenting a surface of a computer-generated object into at least one geometric recursive shape;

associating a point from a plurality of points on the surface to each vertex of the geometric recursive shape by determining the nearest point to each vertex of the geometric recursive shape;

discarding the geometric shape if each vertex is assigned to the same point;

otherwise, subdividing the geometric recursive shape into a plurality of smaller geometric recursive shapes;

associating a point from the plurality of points to each vertex of the smaller geometric recursive shapes by determining the nearest point to each vertex of the smaller geometric recursive shapes;

connecting at least two points of the plurality of points if the at least two points are associated with at least two vertexes of one of the smaller recursive shapes to create a connectivity graph of the plurality of points; and utilizing the connectivity graph to manipulate the computer-generated object corresponding to the plurality of points; wherein the plurality of points do not define the vertices of the geometric recursive shape.

18. The computer-readable storage medium of claim 17 wherein the computer-executable code causes the computing system to further perform the operation of:

determining whether the size of each of the plurality of smaller geometric shapes is less than or equal to a geometric size value.

19. The computer-readable storage medium of claim 17 wherein the location of the smaller geometric shapes on the surface approximates the Voronoi boundaries for the plurality of points.

20. The computer-readable storage medium of claim 17 wherein the connected points approximate the Delauny triangulation of the plurality of points, without computing a Delauny triangulation.

* * * * *